(12) United States Patent
Albers et al.

(10) Patent No.: US 6,719,324 B2
(45) Date of Patent: Apr. 13, 2004

(54) HORN CONTACT APPARATUS AND METHOD

(75) Inventors: Scott R. Albers, Sidney, OH (US); David G. Greenisen, Beavercreek, OH (US); George Frank Richards, Springfield, OH (US)

(73) Assignee: Delphi Technologies, Inc., Troy, MI (US)

( * ) Notice: Subject to any disclaimer, the term of this patent is extended or adjusted under 35 U.S.C. 154(b) by 42 days.

(21) Appl. No.: 10/159,315

(22) Filed: May 31, 2002

(65) Prior Publication Data

US 2003/0184062 A1 Oct. 2, 2003

Related U.S. Application Data

(60) Provisional application No. 60/368,511, filed on Mar. 29, 2002.

(51) Int. Cl.[7] ................................. B60R 21/16
(52) U.S. Cl. ........................ 280/731; 116/59; 200/61.55
(58) Field of Search .............................. 280/731, 728.1, 280/728.2; 116/59; 200/61.54, 61.55

(56) References Cited

U.S. PATENT DOCUMENTS

| 6,422,602 | B1 | * | 7/2002 | Ishii et al. ............... 280/743.1 |
| 6,517,099 | B2 | * | 2/2003 | Igawa et al. ............. 280/728.2 |
| 6,600,114 | B2 | * | 7/2003 | Kikuta et al. ............ 200/61.55 |
| 2002/0053786 | A1 | * | 5/2002 | Paonessa .................... 280/731 |
| 2002/0096865 | A1 | * | 7/2002 | Ford .......................... 280/731 |

* cited by examiner

Primary Examiner—J. Woodrow Eldred
(74) Attorney, Agent, or Firm—Scott A. McBain

(57) ABSTRACT

An enclosed contact horn mechanism includes: a pin having a first end and a second end; a base plate located near the first end; and a device located between the first end and the base plate; the device, the first end, and the base plate creating an enclosed contact area, wherein the device is movable so that the base plate may contact the first end.

26 Claims, 10 Drawing Sheets

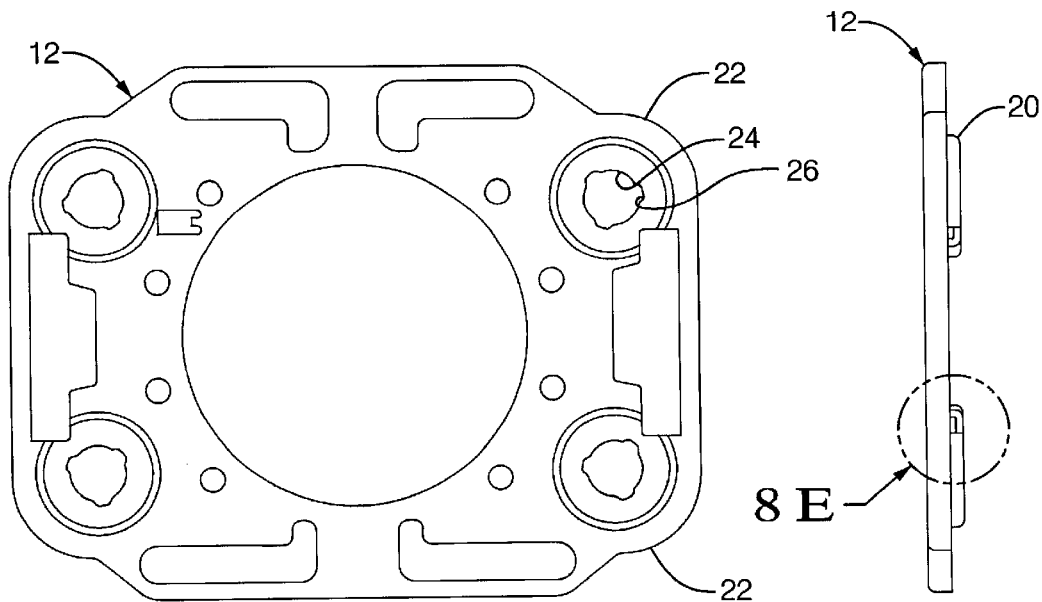
FIG. 8 A
FIG. 8 B
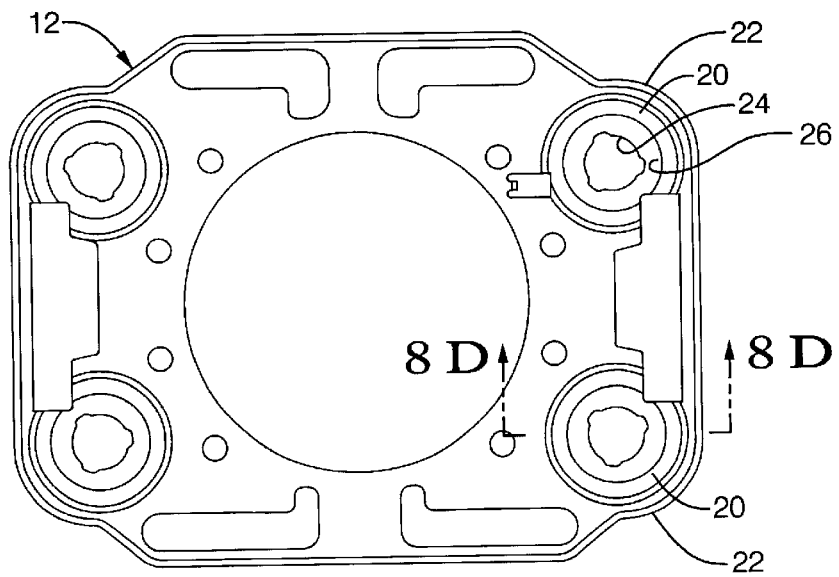
FIG. 8 C
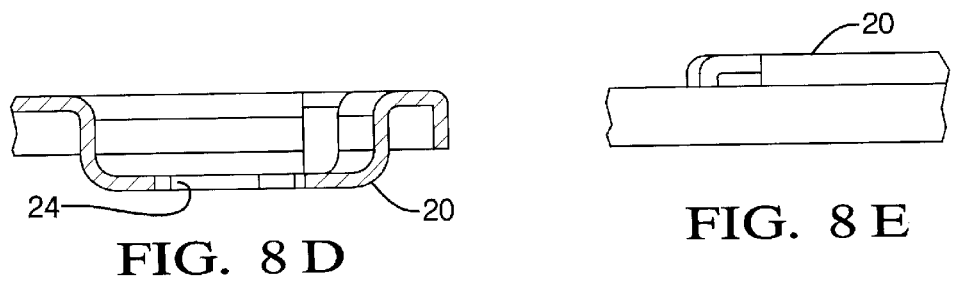
FIG. 8 D
FIG. 8 E

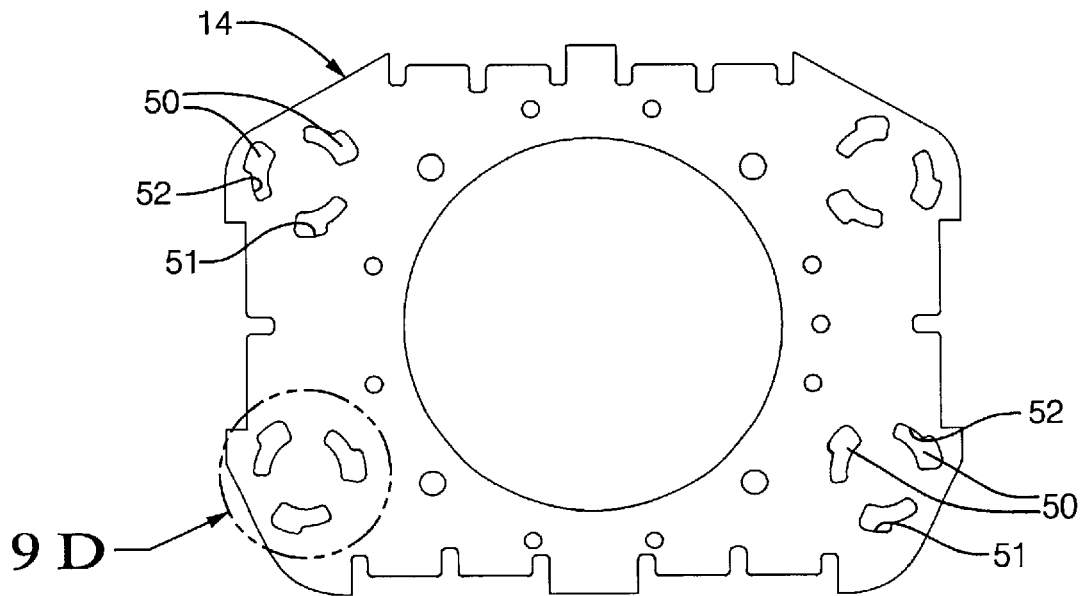
FIG. 9 A
FIG. 9 B
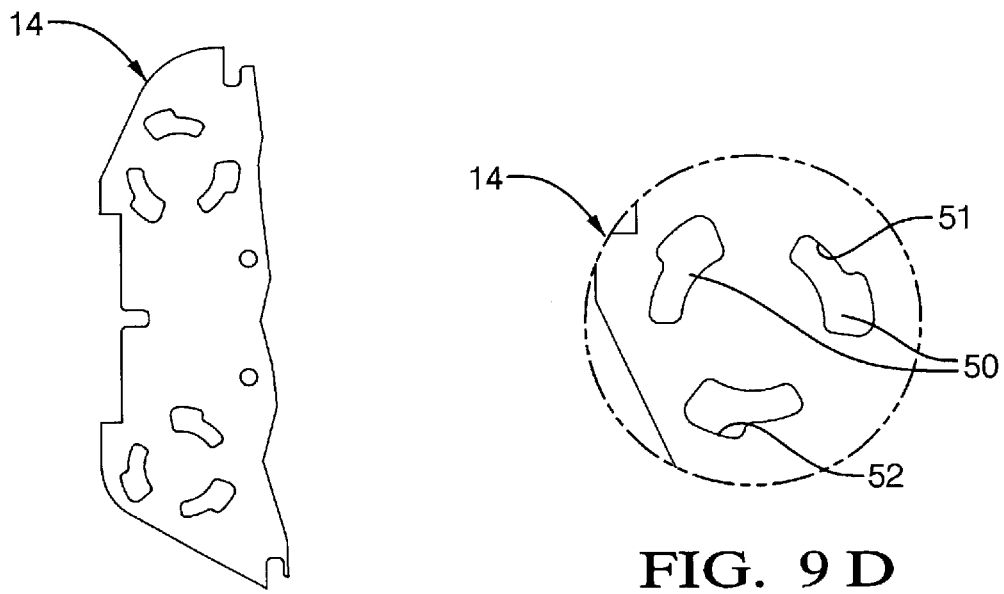
FIG. 9 D
FIG. 9 C

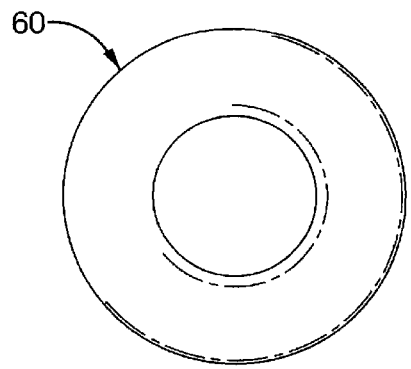
FIG. 12 A
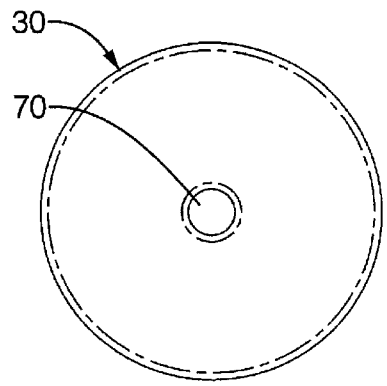
FIG. 12 B
FIG. 11 A
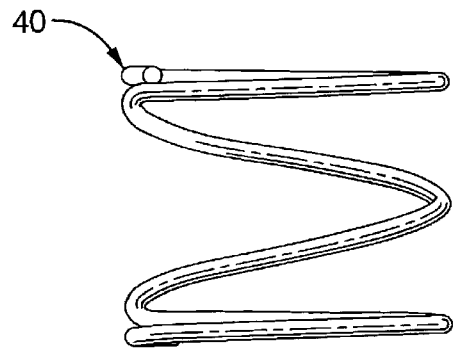
FIG. 13 A
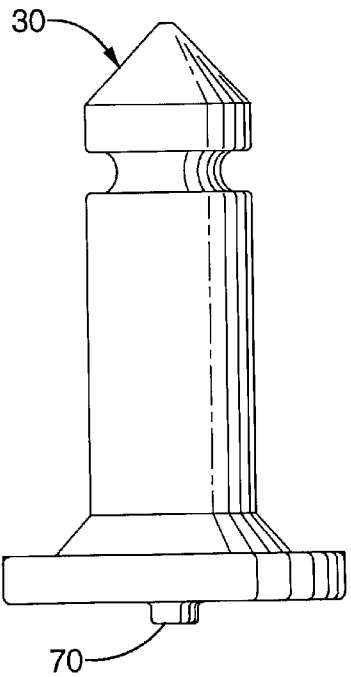
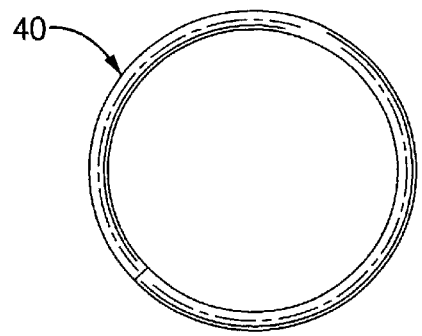
FIG. 11 B
FIG. 13 B

HORN CONTACT APPARATUS AND METHOD

CROSS REFERENCE TO RELATED APPLICATIONS

This application claims the benefit of U.S. provisional application Ser. No. 60/368,511 filed Mar. 29, 2002, the contents of which are incorporated herein by reference thereto.

TECHNICAL FIELD

The present disclosure relates to horn contact mechanisms and more particularly the present disclosure relates to horn contact mechanisms for use with driver's side air bag modules.

BACKGROUND

Vehicles are supplied with driver's side airbag modules; generally the driver's side airbag module is located in the center of the steering wheel. This is also the same location where a horn-activating switch has traditionally been mounted. Thus, when driver's side airbags were first introduced, the horn-activating switch was moved from the center to another location on the steering wheel to make room for the airbag. The horn-activating switches were often mounted on the steering wheel spokes or rim. However, many drivers preferred that the horn-activating switch be located at the center of the steering wheel.

Eventually, the horn-activating switch was adapted for mounting on the underside of the airbag module cover between the inflatable airbag and the cover of the module. This type of switch allowed the horn-activating switch to be placed in its traditional position. Such horn-activating switches react to a user-applied force to the cover in an effort to sound the horn. For example, a floating horn system where the entire airbag moves as force is applied to actuate the horn. However, such existing horn mechanisms contain contact points that are exposed to environmental conditions. These contact points are used to activate the horn by completing an electrical circuit. These exposed contact points can corrode when exposed to environmental conditions. In turn, this corrosion leads to the inability to complete the electrical circuit and blow the horn.

In addition, positive stack up tolerances between horn mechanism components can lead to greater distances of module travel before horn contact is made. The distance between the contact points of the horn mechanism can become greater than the gap between the driver airbag module and the steering wheel. As a result, there could be "no-blow" condition of the horn. Also, the greater distance between contact points can lead to increased horn efforts. Negative stack up tolerances between horn mechanism components can lead to less distances of module travel before horn contact is made. This can lead to inadvertent horn blows, constant horn actuation, and reduced horn efforts.

SUMMARY

The above discussed and other drawbacks and deficiencies are overcome or alleviated by an enclosed contact horn mechanism. An enclosed contact horn mechanism comprising: a pin having a first end and a second end; a base plate located near the first end; and a device located between the first end and the base plate; the device, the first end, and the base plate creating an enclosed contact area, wherein the device is movable so that the base plate may contact the first end.

An enclosed contact horn mechanism comprising: a pin having a first end and a second end, the second end being configured for securing an airbag module to a portion of a steering wheel. The module also has a base plate located near the first end and a device located between the first end of the pin and the base plate. The device, the first end, and the base plate creating an enclosed contact area, wherein the device is configured so that the base plate may contact the first end.

BRIEF DESCRIPTION OF THE DRAWINGS

FIGS. 8A–8E illustrate a backing plate constructed in accordance with the present disclosure;

FIGS. 9A–9D illustrate a base plate constructed in accordance with the present disclosure;

FIGS. 11A–11B illustrate a contact pin constructed in accordance with the present disclosure;

FIGS. 12A–12B illustrate a washer constructed in accordance with the present disclosure;

FIGS. 13A–13B illustrate a coil constructed in accordance with the present disclosure;

DETAILED DESCRIPTION

Figure 1:
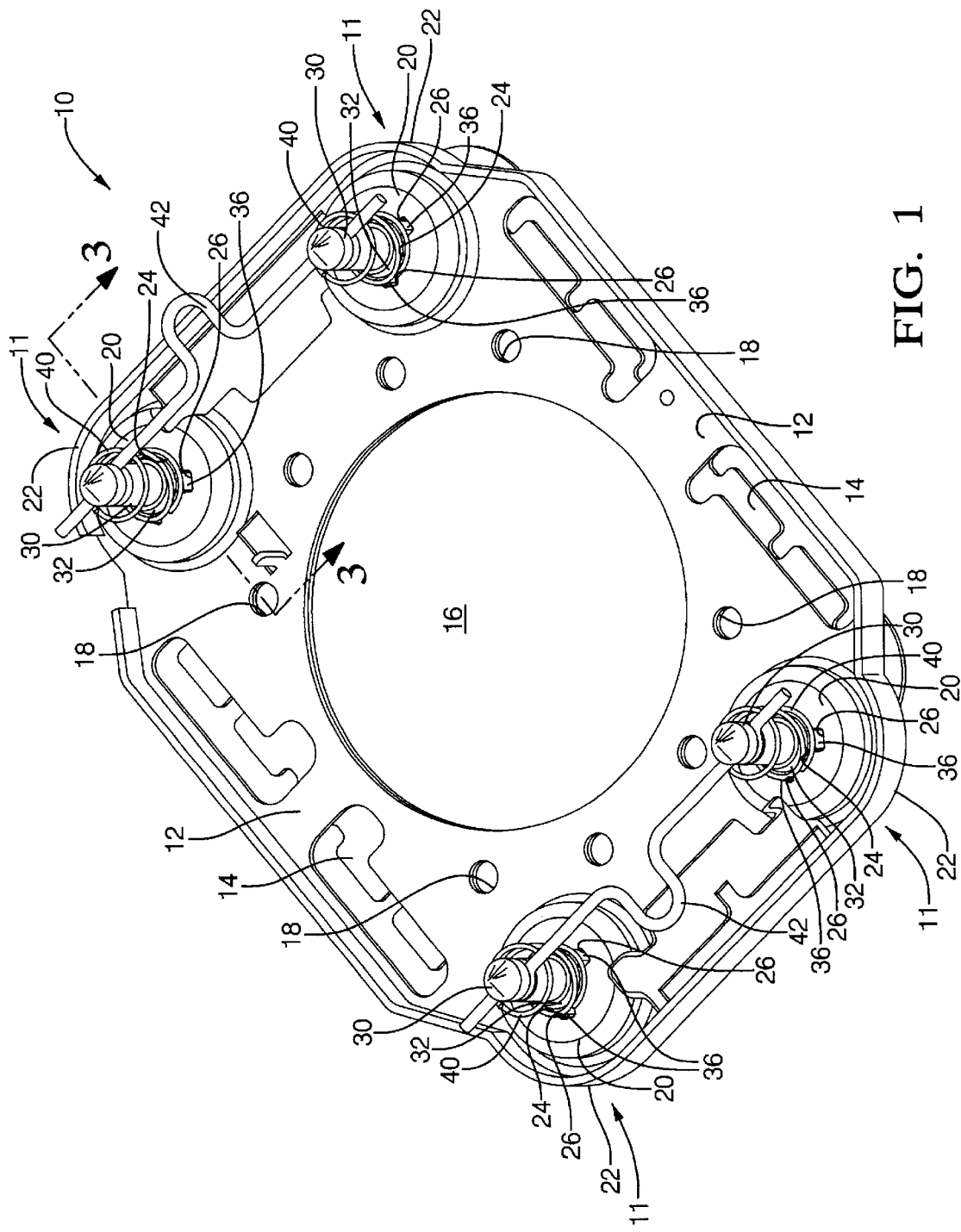
FIG. 1 is a perspective view of a mounting side of a portion of a driver's side air bag module with a horn contact mechanism.

Referring to FIG. 1, a portion of a driver's side air bag module (module) 10 having a horn contact mechanism 11 is illustrated. Module 10 has among other elements a backing plate 12 (See also FIGS. 8A–8E) and a base plate 14 (See also FIGS. 9A–9D). Both backing plate 12 and base plate 14 have a large center opening 16 and smaller connection openings 18 surrounding center opening 16. Connection openings 18 are used to secure an inflator (not shown) to module 10. A portion of the inflator is received within opening 16. Backing plate 12 has four raised areas 20 located at each corner 22 of backing plate 12. Raised areas 20 define an area 21 for receiving a portion of the horn contact mechanism. Area 21 is sufficiently large enough to house portions of the horn contact mechanism which will be discussed in more detailed below. Each raised area 20 has a pin opening 24 with three grooves 26 or areas located around the periphery of pin opening 24. Of course, the number and configuration of grooves or openings 26 may vary. A pin 30 extends through pin opening 24. Pin 30 is made of a material that can conduct electricity and is preferably steel. Pin 30 serves a dual purpose of securing the driver's side airbag (DAB) to the steering wheel and providing a contact portion of horn contact mechanism. In an exemplary embodiment Pin 30 remains fixedly secured to an armature of a steering column while driver's side air bag module 10 moves upon an actuation force provided by a vehicle operator. The movement of driver's side air bag module 10 causes a portion of the pin to become in contact with another portion of the driver's side air bag module in order to complete the electrical circuit of the horn switch.

Figure 3A:
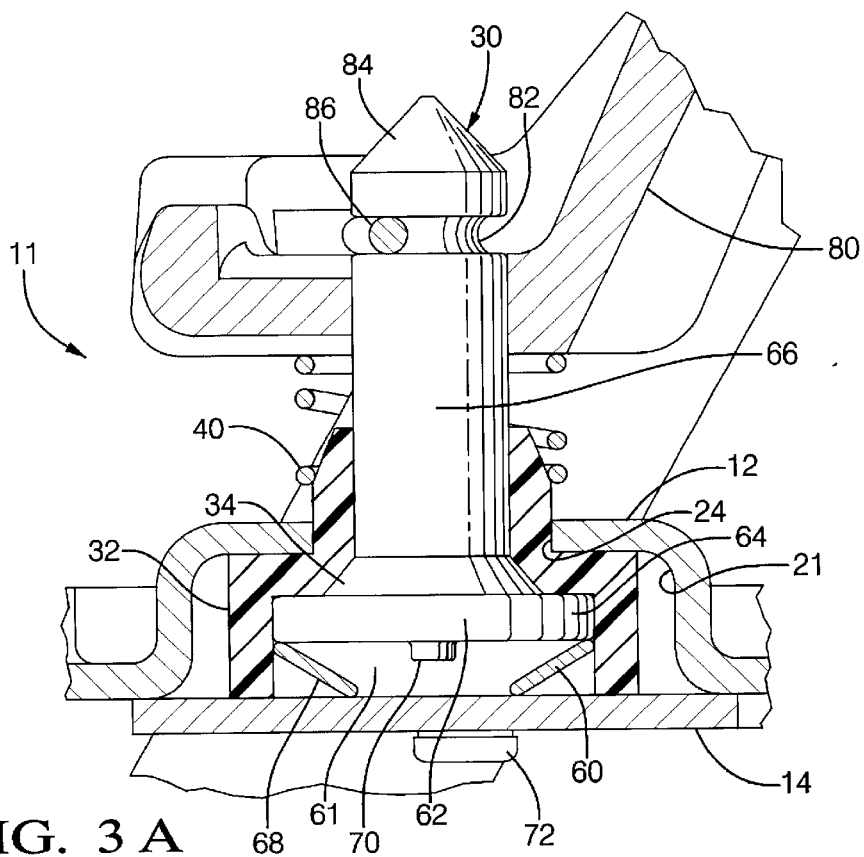
FIGS. 3A–3B illustrate operational aspects of the horn contact mechanism of the present disclosure along lines 3—3 of FIG. 1.
Figure 3B:
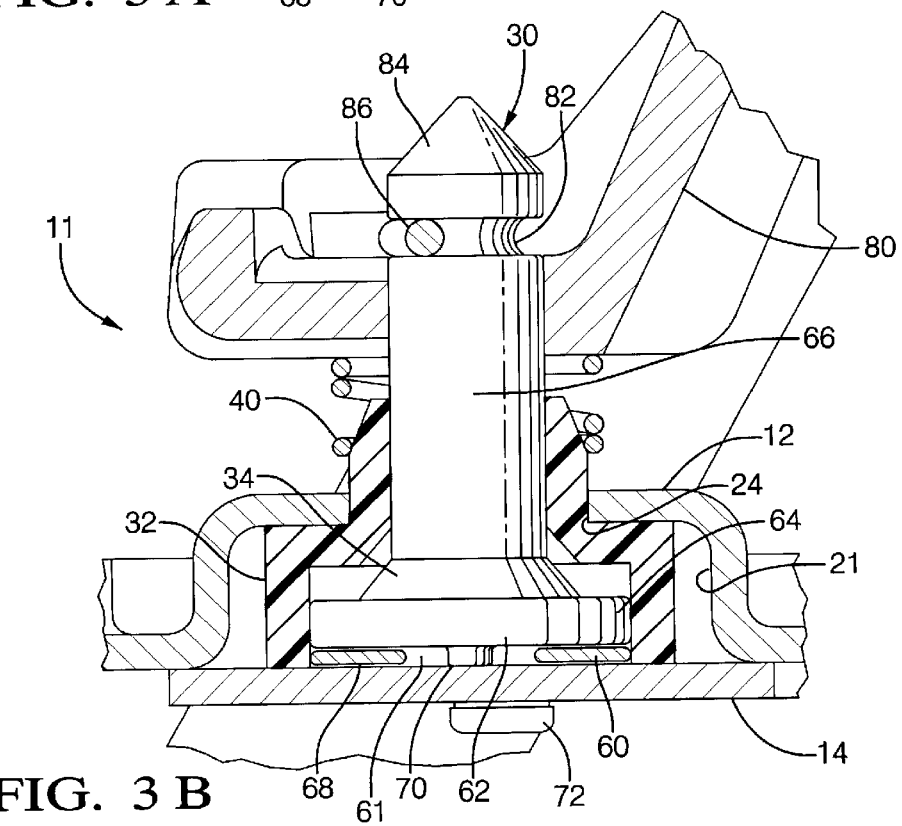

An insulator 32 (See also FIGS. 10A–10E), which is preferably made from plastic or other nonconductive material, is disposed about a base 34 (see FIG. 3) of pin 30. Alternatively, insulator 32 is positioned within area 21 of raised area 20. Insulator 32 has three features or bumps 36 that fit within grooves or openings 26. Of course, the number of features 36 may vary along with the number of openings 26. A coil 40 (See also FIGS. 13A–13B) surrounds pin 30 and fits over insulator 32. Coil 40 is configured to provide a biasing force between insulator 32 and a portion of the steering wheel armature 80 (See FIGS. 3A, 3B, 4 and 7) that pin 30 is secured to. Coil 40 may also be connected directly to insulator 32. A locking spring 42 secures four of pins 30 to a portion of an armature 80 (See FIGS. 3A–3B and 4). Locking spring 42 is configured to make contact with grooves located on a portion of pin 30. Accordingly, locking pin 42 secures pins 30 and driver's side air bag module 10 to an armature 80 of a steering wheel.

Figure 2:
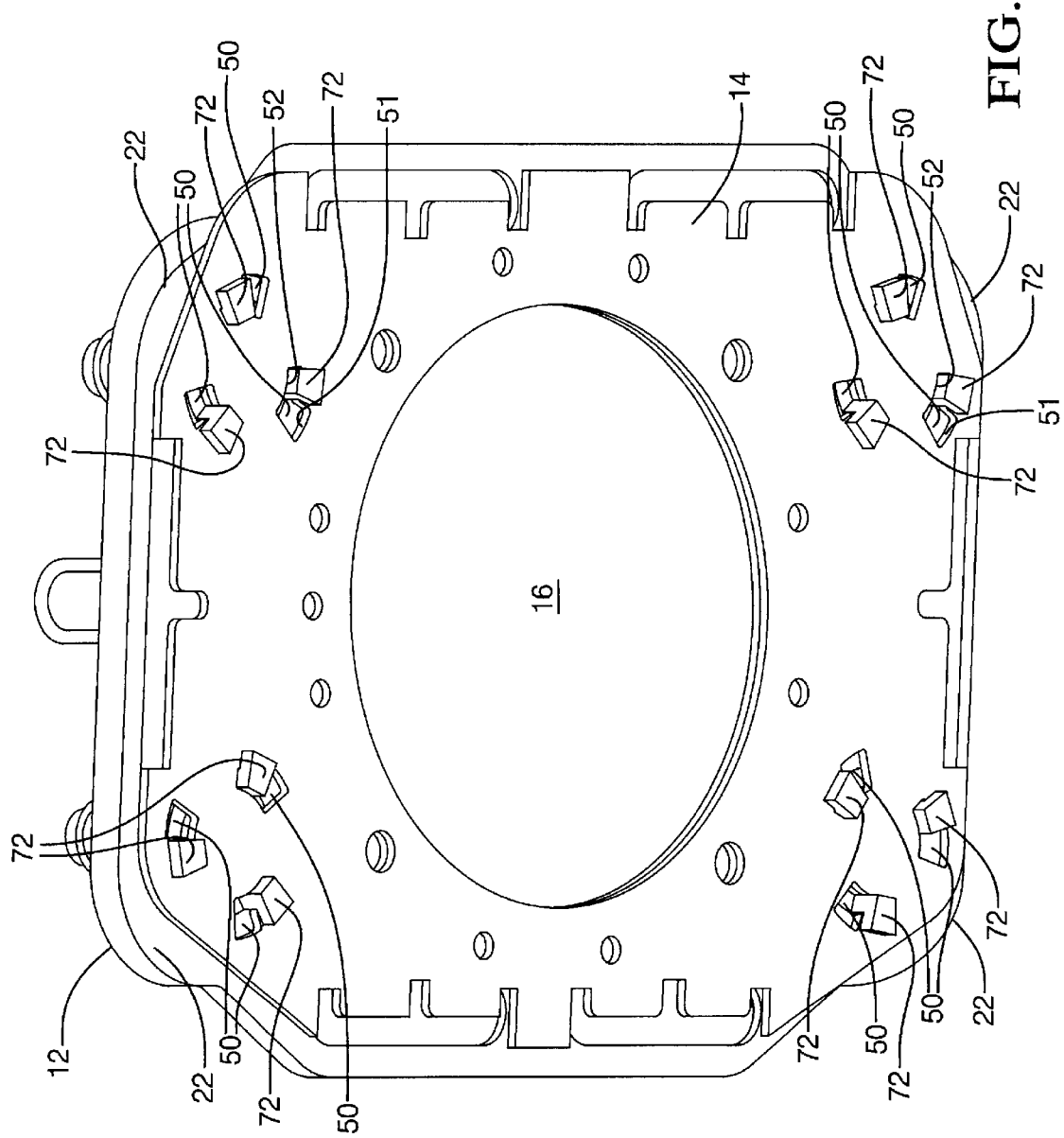
FIG. 2 is another perspective view of a portion of a DAB illustrated in FIG. 1.

Referring now to FIG. 2, base plate 14 has a plurality of slots 50 located at each corner 22 of base plate 14. Slots 50 line up under raised areas 20 (see FIG. 1) of backing plate 12 when backing plate 12 and base plate 14 are assembled. In particular, there are three slots 50 located at each corner 22 and each of the three slots 50 aligns with each groove 26 in pin opening 24 (see FIG. 1). Slots 50 are shaped so that there is a first end 51 that is larger than a second end 52 of each slot 50.

Referring to FIG. 3, a side view of pin 30 assembled with backing plate 12 and base plate 14 is illustrated. A sealing means or device, such as a urethane washer 60, having a central opening is located in a cavity 61 between a first end 62 of pin 30 and base plate 14. First end 62 has a flange 64 that is wider than width of a main body 66 of pin 30. Main body 66 and insulator 32 are configured to allow insulator 32 to move with respect to pin 30 as a force is being applied to the air bag module. First end 62 also has an extension or contact point 70, which protrudes outwardly from a portion of first end 62. Extension 70 protrudes a distance that is greater than the thickness of a side 68 of washer 60. Thus, if washer 60 is flattened against first end 62, extension 70 extends through the central opening of washer 60.

Pin 30 and washer 60 are inserted into insulator 32 prior to securement of backing plate 12 to base plate 14. Insulator 32 fits over flange 64 and extends up along main body 66 of pin 30. Insulator 32 has three features or hooked ends 72 (only one shown) that depend away from insulator 32 and extend past washer 60 when insulator 32 is assembled with pin 30 and washer 60. Hooked ends 72 are configured to be inserted into and through first end 51 of slots 50 (see FIG. 2) of base plate 14. In order to secure insulator 32 to base plate 14 insulator 32 is then rotated so that hooked ends 72 slide in slots 50 so that hooked ends 72 are located at second end 52 of slots 50 (see FIG. 2). This movement of insulator 32 secures pin 30, washer 60, and insulator 32 to base plate 14. In addition, and through the securement of insulator 32 and a device such as washer 60 cavity 61 is an enclosed contact area, which is located between first end 62 of pin 30 and base plate 14. The enclosed contact area is completely enclosed by washer 60, pin 30, and base plate 14. Thus, extension 70, which in the position illustrated in FIG. 3B, contacts base plate 14 and is located within the enclosed contact area and is not exposed to the elements.

Backing plate 12 is then assembled so that pins 30 are inserted through pin openings 24 located at raised areas 20 (also see FIG. 1). Raised areas 20 are configured so that backing plate 12 is seated against insulator 32. As such, a portion of both pin 30 and insulator 32 are located within pin opening 24. Pin opening 24 is smaller than flange 64 of pin. Backing plate 12 also helps to secure insulators 32 to base plate 14. This also provides additional strength to insulators 32. Coil 40 is then inserted over pin 30 and insulator 32.

Referring again to FIG. 1, bumps or features 36 are configured to fit within grooves or openings 26, which holds insulator 32 in place so that insulator 32 does not rotate and allow hooked ends 72 to release from slots 50. Backing plate 12 and base plate 14 are secured to each other when an inflator (not shown) of the driver's side air bag module is secured to the backing plate 12 and base 14, which occurs at small connection openings 18.

Figure 4:
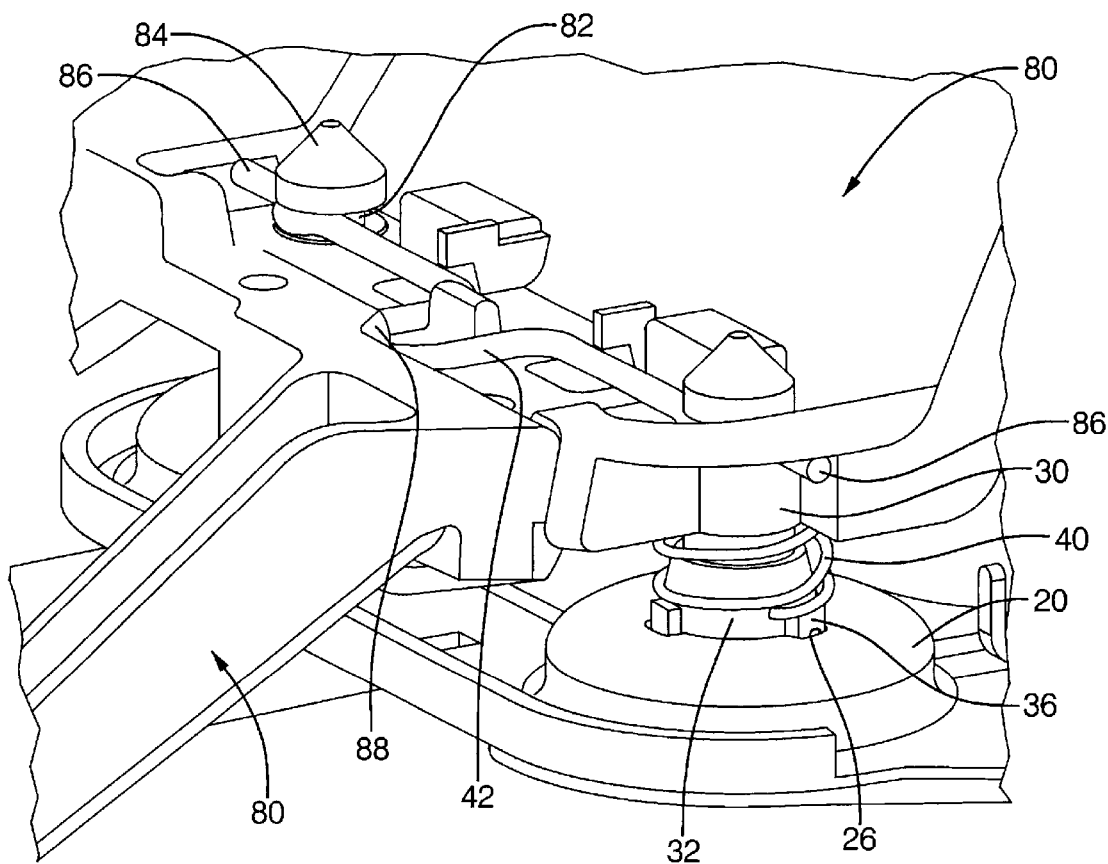
FIG. 4 is perspective view of a portion driver's side air bag module secured to an armature of a steering wheel.

Referring to FIGS. 3 and 4, pins 30 are attached to a steering wheel armature (armature) 80 through locking spring 42. Locking spring 42 fits into a notch 82 at a second end 84 of pin 30. Locking spring 42 has ends 86 that are located under armature 80. In addition, locking spring 42 also hooks under an extension 88 of armature 80. Extension 88 is located approximately half way between two pins 30 (see FIG. 4). As such, locking spring 42 secures pins 30 to armature 80. Armature 80 contains power leads for the horn system, initiation of the air bag, and for power controls on the steering wheel.

Figure 5:
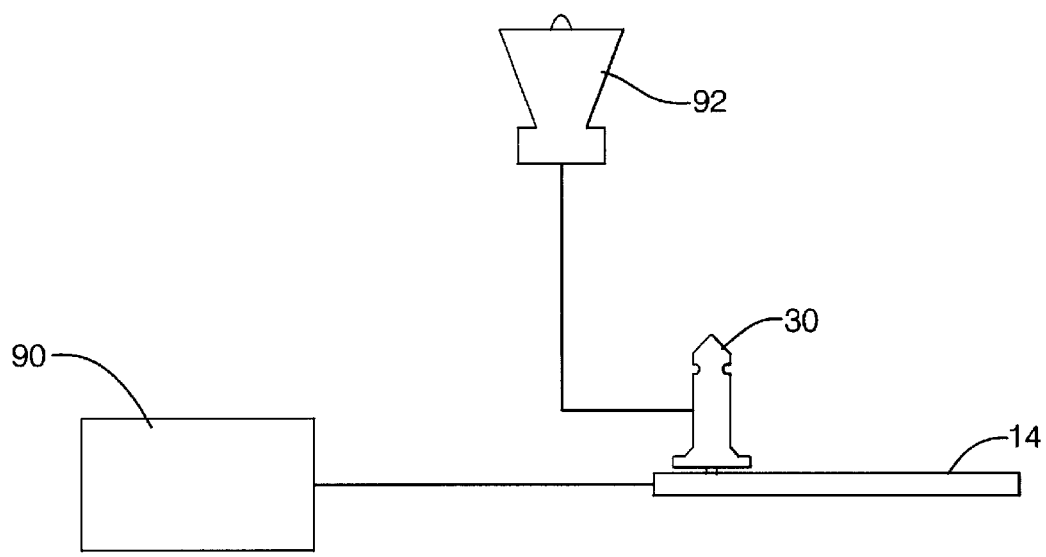
FIG. 5 is a block diagram showing a driver's side driver air bag module connected to a power source and a horn.

Referring now to FIG. 5, base plate 14 is electrically connected to a power source 90 through a lead so that base plate 14 is "hot" or provided with an electrical current. In addition, pin 30 is electrically connected to a horn 92 through armature 80 or other connection means such as an electrical lead. Therefore, the horn circuit is open when the pin 30 is in the position illustrated in FIG. 3A. This is provided by the insulating qualities of insulator 32 and the air gap between extension 70 and base plate 14. Alternatively, base plate 14 is electrically grounded and contact between pin 30 and base plate 14 is used to complete the horn activation circuit.

Figure 7:
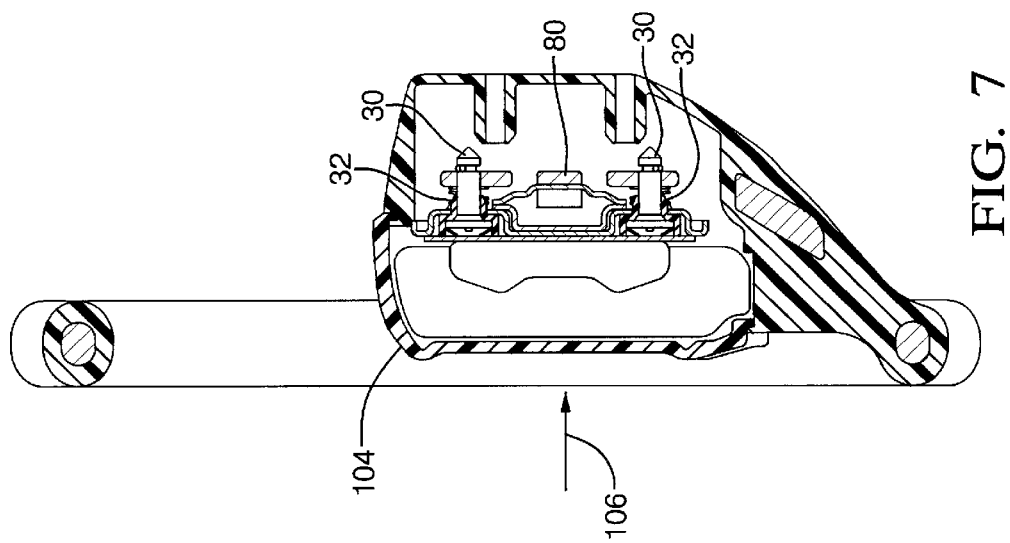
FIG. 7 is a view along lines 7—7 of FIG. 6.
Figure 6:
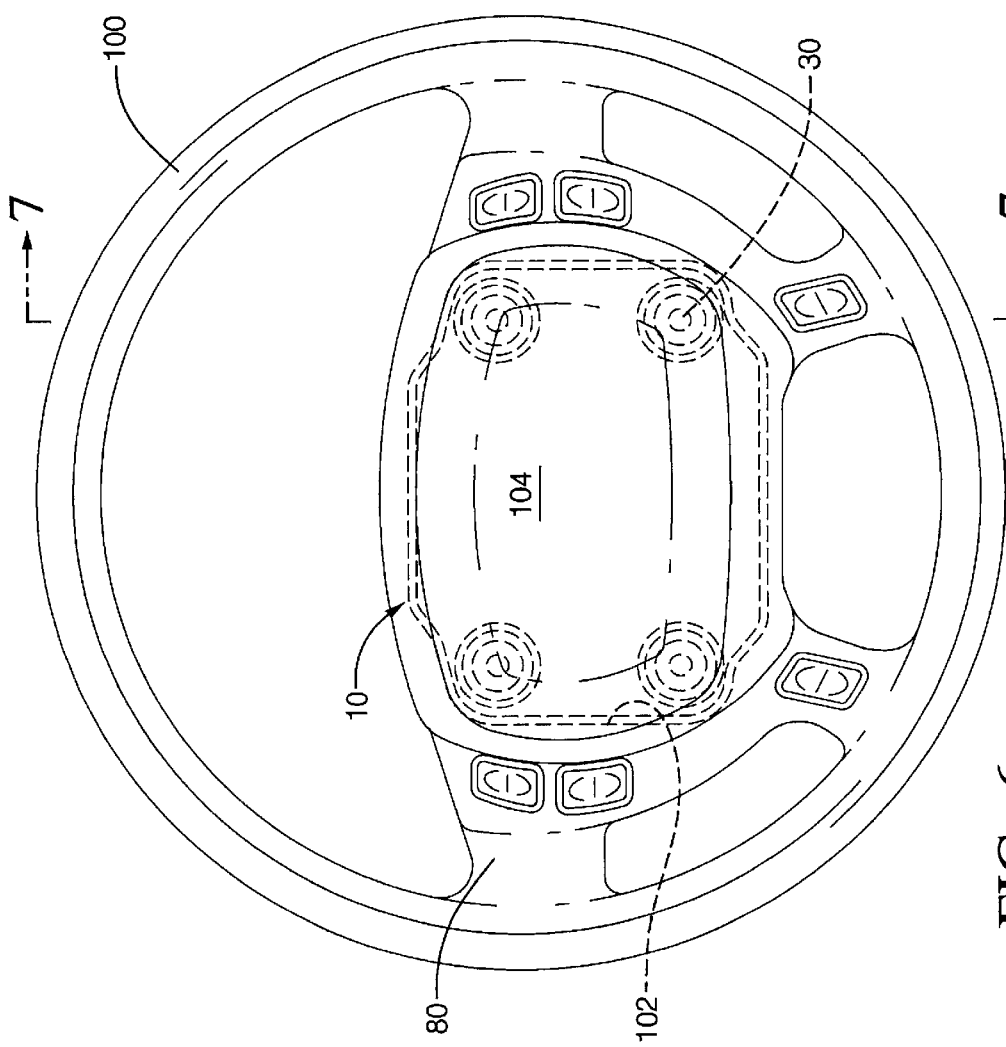
FIG. 6 is a top plan view of a steering wheel with a driver's side air bag module.
Figure 10:
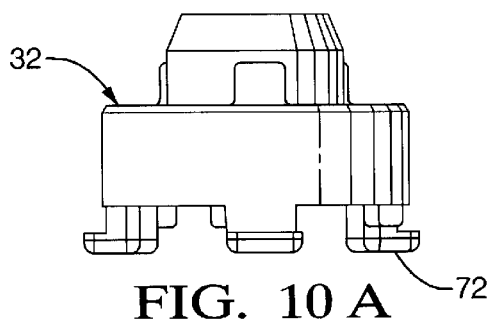
FIGS. 10A–10C illustrate an insulator constructed in accordance with the present disclosure.
FIG. 10D is a view along lines 10D–10D of FIG. 10C.
FIG. 10E is a view along lines 10E–10E of FIG. 10C.
Figure 10:
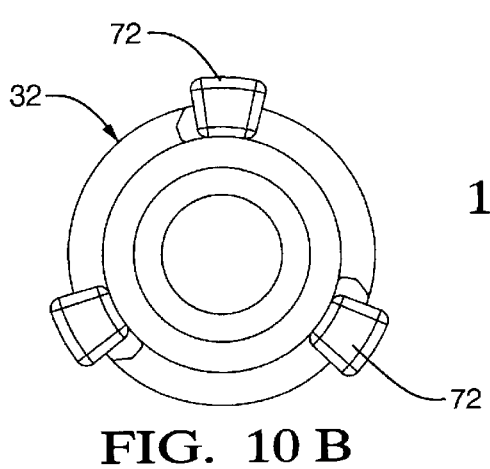
Figure 10:
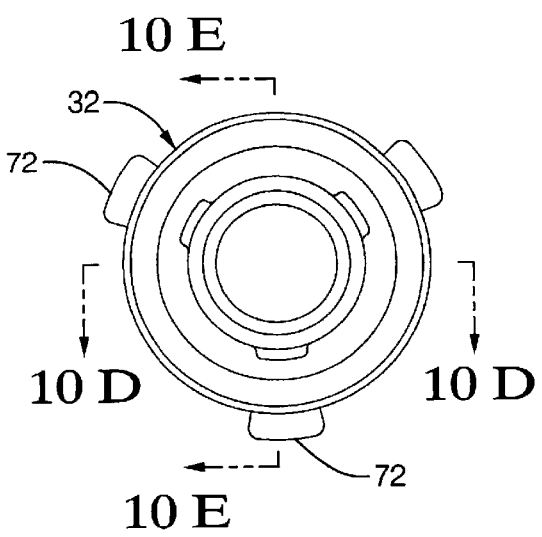
Figure 10:
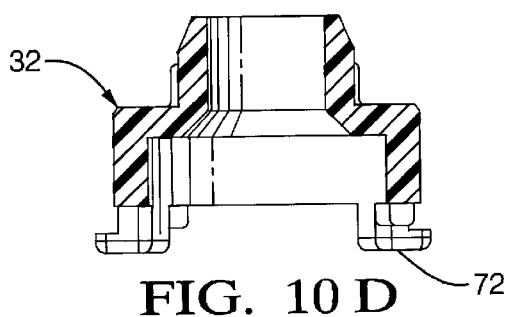
Figure 10:
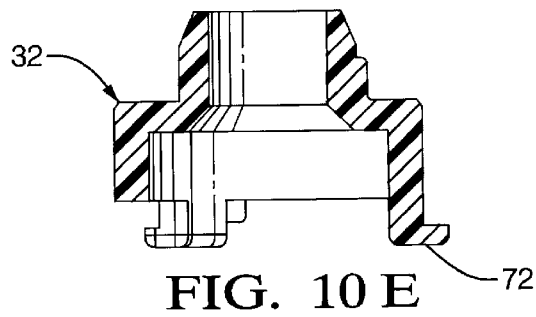

Referring to FIGS. 6 and 7, module 10 is located at a steering wheel 100. Module 10 is located within an inside area 102 of steering wheel 100. A deployable cover 104 as is known in the art is located over module 10.

Referring now to FIGS. 1–7, horn contact mechanism 11 operates as follows. A driver pushes on cover 104 of steering wheel 100. As the driver pushes on cover 104, a force is applied to module 10 in the direction of arrow 106. As a result, base plate 14 and backing plate 12 move and compress coils 40 located at each pin 30. As base plate 14 and backing plate 12 move, insulator 32 also moves with base plate 14, which causes base plate 14 to compress washer 60. Washer 60 flattens so that extension 70 comes into contact with base plate 14. When extension 70 contacts base plate 14, the electrical circuit for horn 92 is complete and horn 92 is activated. Horn 92 is grounded at armature 80. When the driver stops pressing on the steering wheel, coil 40 forces module 10 back to its starting position and extension 70 is no longer in contact with base plate 14 and horn 92 is no longer activated.

Although four contact mechanisms are shown in the aforementioned Figures it is contemplated that the driver's side air bag module can be constructed with more or less than four mechanisms and not all pins need to be configured as a horn contact mechanism.

Alternatively, washer 60 could be removed and module 10 would operate in the same manner as described above. In that embodiment, extension 70 is still located in the enclosed contact area, and extension 70 is completely enclosed by insulator 32, pin 30, and base plate 14. In either embodiment, extension 70 remains fully enclosed.

Figure 14:
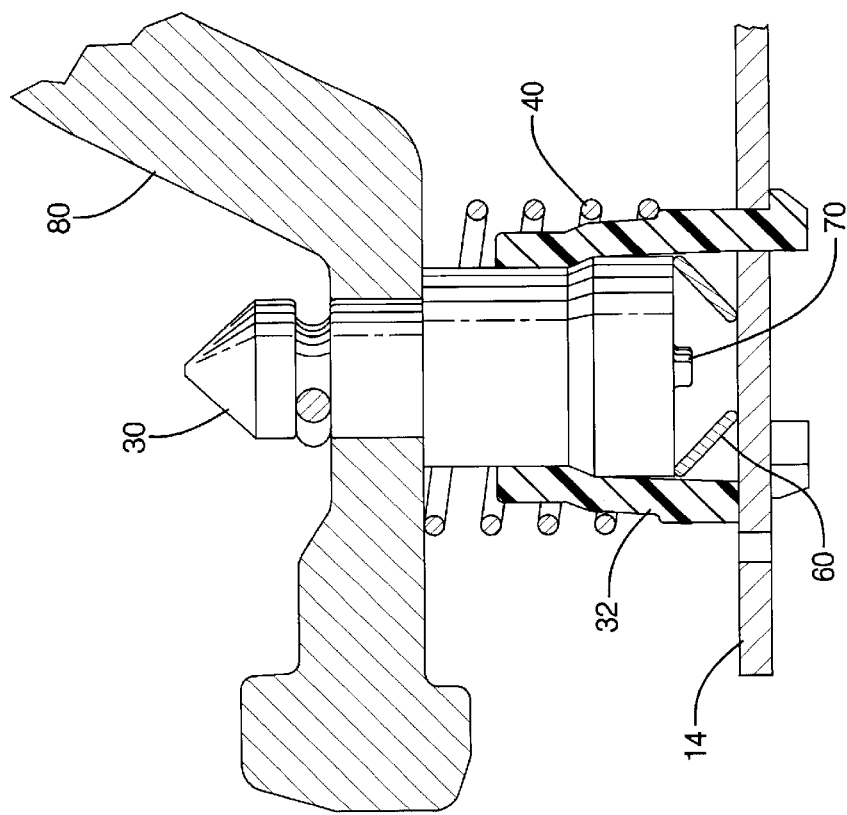
FIG. 14 is a cross-sectional view of an alternative embodiment of the present disclosure.

Referring to FIG. 14, an alternative embodiment for enclosed contact horn mechanism 11 is illustrated. This embodiment is similar to the one described in FIGS. 1–7; however, air bag module 10 is constructed without backing plate 12.

Figure 15:
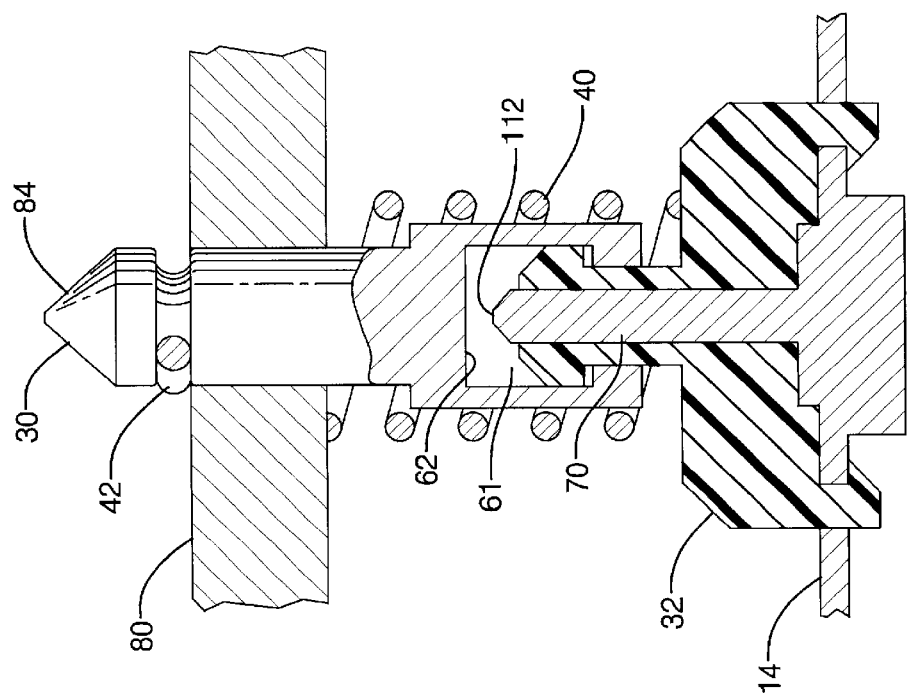
FIG. 15 is a cross-sectional view of another alternative embodiment of the present disclosure.

Referring to FIG. 15, an alternative embodiment for enclosed contact horn mechanism 11 is illustrated. This embodiment is also similar to the one described in FIGS. 1–7. Extension 70 extends from base plate 14 into cavity 61, which is an enclosed contact area in which a first end 112 of extension contacts pin 30. Extension 70 may be part of base plate 14, or may be connected to base plate by welding or other such manner known in the art. Insulator 32 surrounds extension 70, except at a first end 112. This embodiment operates as follows. A driver exerts a force on base plate 14, which moves and compresses coils 40 located at each pin 30. As base plate 14 moves, insulator 32 and extension 70 also move with base plate 14, which causes first end 112 of extension 70 to come into contact with pin 30. When extension 70 contacts pin 30, the electrical circuit for horn 92 (see FIG. 5) is complete and horn 92 is activated. Horn 92 is grounded at armature 80. When the driver stops pressing on the steering wheel, coil 40 forces base plate 14 back to its starting position. Extension 70 is no longer in contact with base plate 14 and horn 92 is no longer activated.

Module 10 having an enclosed contact horn mechanism 11 provides for cavity 61, which is also the enclosed contact area, and provides that the contact area for horn 92, which occurs at extensions 70, is not susceptible to environmental conditions. Consequently, extensions 70 will not corrode, which provides for improved horn blow activation. In addition, module 10 provides for all contact surfaces to occur within one assembly located at module 10. The design also provides in-line contact points and reduces the amount of stack tolerances. As such, module 10 is also less susceptible to inadvertent horn actuation.

While this invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An enclosed contact horn mechanism comprising:
   a pin having a first end and a second end;
   a base plate located near said first end; and
   an insulating device located between said first end and said base plate; said insulating device, said first end, and said base plate creating an enclosed contact area, wherein said pin and said insulating device are configured so that said base plate may travel from a non-contacting open circuit position to a contacting closed circuit position.

2. The mechanism of claim 1, wherein said insulating device is connected to said base plate.

3. The mechanism of claim 2, further comprising a backing plate located and secured adjacent to said base plate, said backing plate defining a receiving area for receiving a portion of said insulating device and a portion of said pin.

4. The mechanism of claim 3, further comprising a biasing member for providing a biasing force to said insulating device, said biasing member being disposed between said insulating device and a steering wheel armature, said second end of said pin being secured to said steering wheel armature.

5. The mechanism of claim 4, wherein said base plate is in electrical communication with a power source and said second end is in electrical communication with a horn.

6. The mechanism of claim 4, wherein said receiving area comprises an opening for receiving a portion of said insulating device and said insulating device comprises an opening for slidably receiving a portion of said pin.

7. The mechanism of claim 6, wherein said opening of said receiving area is configured to receive a plurality of features of said insulating device.

8. The mechanism of claim 7, wherein said plurality of features prevents rotation of said insulating device within said receiving area.

9. The mechanism of claim 8 wherein said base plate is in electrical communication with a power source and said second end is in electrical communication with a horn.

10. The mechanism of claim 1, wherein a urethane washer is disposed within said enclosed contact area between said pin and said base plate.

11. The mechanism of claim 10, wherein said first end has an extension that extends from said first end, said extension having a dimension greater than said urethane washer and said extension is configured for making contact with said base plate.

12. The mechanism of claim 11, wherein said urethane washer is compressed as said base plate travels from said non-contacting open circuit position to said contacting closed circuit position.

13. The mechanism of claim 5, wherein said pin provides a means for securing an air bag module to said steering wheel armature.

14. The mechanism of claim 13, wherein a urethane washer is disposed within said enclosed contact area between said pin and said base plate and said first end has an extension that extends from said first end, said extension having a dimension greater than said urethane washer and said extension is configured for making contact with said base plate, wherein said urethane washer is compressed as said base plate travels from said non-contacting open circuit position to said contacting closed circuit position.

15. The mechanism of claim 8, wherein a urethane washer is disposed within said enclosed contact area between said pin and said base plate and said first end has an extension that extends from said first end, said extension having a dimension greater than said urethane washer and said extension is configured for making contact with said base plate, wherein said urethane washer is compressed as said base plate travels from said non-contacting open circuit position to said contacting closed circuit position.

16. A horn switch comprising:
a plurality of pins each having a first end and a second end, said second end being configured for securing an air bag module to a steering wheel armature;
a base plate having a plurality of insulating devices one for each of said plurality of pins said insulating devices being located between said first end of said plurality of pins and said base plate, said plurality of insulating devices, said first ends, and said base plate creating a plurality of enclosed contact areas,
wherein said pins and said insulating devices are configured so that said base plate may travel from a non-contacting open circuit position to a contacting closed circuit position.

17. The horn switch as in claim 16, wherein said insulating device is connected to said base plate and a backing plate is located and secured adjacent to said base plate, said backing plate defining a receiving area for receiving a portion of each of said insulating devices and a portion of each of said pins.

18. The horn switch as in claim 17, further comprising a plurality of biasing members for providing a biasing force to each of said insulating devices, said plurality of biasing members being disposed between said insulating devices and said steering wheel armature.

19. The mechanism of claim 18, wherein said base plate is in electrical communication with a power source and said second end of said plurality of pins are in electrical communication with a horn.

20. The mechanism of claim 19, wherein a urethane washer is disposed within each of said enclosed contact areas between said pins and said base plate and said first end of each of said plurality of pins has an extension that extends from said first end, said extension having a dimension greater than said urethane washer and said extension is configured for making contact with said base plate, wherein said urethane washer is compressed as said base plate travels from said non-contacting open circuit position to said contacting closed circuit position.

21. An air bag module comprising:
a base plate;
a backing plate defining a plurality of areas each receiving an enclosed contact horn mechanism including:
a pin having a first end and a second end, said first end located near said base plate, said pin having a means for securing the air bag module to a steering wheel armature; and
an insulating device disposed between a portion of said pin proximate to said first end and said area, wherein said base plate, said insulating device and said pin create an enclosed contact area,
wherein said first end is slidably received within said enclosed contact area, said pin and said insulating device are configured so that said base plate may travel from a non-contacting open circuit position wherein said base plate is in a spatial relationship with respect to said pin, to a contacting closed circuit position, wherein said base plate makes contact with said pin, said contacting closed circuit position activates a horn.

22. The air bag module as in claim 21, further comprising a biasing member for providing a biasing force to said insulating device, said biasing member being disposed between said insulating device and said steering wheel armature.

23. The air bag module as in claim 22, wherein said base plate is in electrical communication with a power source and said second end is in electrical communication with said horn.

24. The air bag module as in claim 23, wherein a urethane washer is disposed within said enclosed contact area between said pin and said base plate and said first end has an extension that extends from said first end, said extension having a dimension greater than said urethane washer and said extension is configured for making contact with said base plate, wherein said urethane washer is compressed as said base plate travels from said non-contacting open circuit position to said contacting closed circuit position.

25. A steering wheel comprising:
an air bag module comprising a base plate, a backing plate and a plurality of contact pins, said plurality of contact pins each being configured for a securement to a steering wheel armature at one end and movably received within an enclosed contact area at the other end;
an insulating device for each of said plurality of contact pins, said insulating device being disposed between said pin and said backing plate, said insulating device defining a portion of said enclosed contact area; and
a biasing member for providing a biasing force to said insulating device, said biasing member being disposed between said insulating device and said steering wheel armature, said biasing member maintaining said contact pin in a spaced relationship with respect to said base plate wherein application of a horn activation force to said air bag module causes said biasing force to be overcome and at least one of said plurality of contact pins makes contact with said base plate and completes a horn activation circuit.

26. The steering wheel as in claim 25, wherein a urethane washer is disposed within said enclosed contact area between said pin and said base plate and said pin has an extension that extends from pin, said extension having a dimension greater than said urethane washer and said extension is configured for making contact with said base plate, wherein said urethane washer is compressed as said base plate travels towards said extension.

* * * * *